United States Patent [19]
Scales et al.

[11] Patent Number: 5,950,228
[45] Date of Patent: Sep. 7, 1999

[54] VARIABLE-GRAINED MEMORY SHARING FOR CLUSTERS OF SYMMETRIC MULTI-PROCESSORS USING PRIVATE AND SHARED STATE TABLES

[75] Inventors: Daniel J. Scales, Palo Alto; Kourosh Gharachorloo, Menlo Park, both of Calif.; Anshu Aggarwal, Boulder, Colo.

[73] Assignee: Digital Equipment Corporation, Maynard, Mass.

[21] Appl. No.: 08/794,172

[22] Filed: Feb. 3, 1997

[51] Int. Cl.$^6$ .................................................... G06F 13/00
[52] U.S. Cl. ........................................... 711/148; 711/147
[58] Field of Search .................................. 711/122, 148; 395/800.06, 825

[56] References Cited

U.S. PATENT DOCUMENTS

| | | | |
|---|---|---|---|
| 4,442,487 | 4/1984 | Fletcher et al. | 711/122 |
| 5,428,803 | 6/1995 | Chen et al. | 395/800.06 |
| 5,758,183 | 5/1998 | Scales | 395/825 |
| 5,761,729 | 6/1998 | Scales | 711/148 |

OTHER PUBLICATIONS

Yeung, Donald and Kubiatowicz, John and Agarwal, Anant; Laboratory for Computer Science, MIT, 1996; *MGS: A Multigrain Shared Memory System*, pp. 1–4.

Erlichson, Andrew and Nuckolls, Neal and Chesson, Greg and Hennessy, John, Computer Systems Lab, Stanford U and Silicon Graphics, Inc., Mt. View, CA; 1996; *SoftFLASH: Analyzing the Performance of Clustered Distributed Virtual Shared Memory*, p. 11.

*Primary Examiner*—Tod R. Swann
*Assistant Examiner*—David Langjahr
*Attorney, Agent, or Firm*—Robert A. Cesari; Cesari & McKenna, LLP

[57] ABSTRACT

In a distributed shared memory system, clusters of symmetric multi-processors are connected to each other by a network. Each symmetric multi-processor includes a plurality of processors, a memory having addresses, and an input/output interface to interconnect the processors. A software implemented method enables data sharing between the clusters of symmetric multi-processors using variable sized quantities of data called blocks. A set of the addresses of the memories are designated as virtual shared addresses to store shared data, and a portion of the virtual shared addresses are allocated to store a shared data structure as one or more blocks. The size of a particular allocated block can vary for different shared data structures. Each block includes an integer number of lines, and each line includes a predetermined number of bytes of shared data. Directory information of a particular block is stored in the memory of a processor designed as the home of the block. The directory information includes the size of the particular block, the identity of the processor that last modified the data in the particular block and the identity of all processors having a copy of the block.

20 Claims, 14 Drawing Sheets

VARIABLE-GRAINED MEMORY SHARING FOR CLUSTERS OF SYMMETRIC MULTI-PROCESSORS USING PRIVATE AND SHARED STATE TABLES

FIELD OF THE INVENTION

The present invention relates generally to symmetric multi-processors, and more particularly to sharing data among symmetric multi-processors.

BACKGROUND OF THE INVENTION

Distributed computer systems typically comprise multiple computers connected to each other by a communications network. In some distributed computer systems, the networked computers can access shared data. Such systems are sometimes known as parallel computers. If a large number of computers are networked, the distributed system is considered to be "imassively" parallel. As an advantage, massively parallel computers can solve complex computational problems in a reasonable amount of time.

In such systems, the memories of the computers are collectively known as a distributed shared memory (DSM). It is a problem to ensure that the data stored in the distributed shared memory are accessed in a coherent manner. Coherency, in part, means that only one processor can modify any part of the data at any one time, otherwise the state of the system would be non-deterministic.

FIG. 1 shows a typical distributed shared memory system 100 including a plurality of computers 110. Each computer 110 includes a uni-processor 101, a memory 102, and input/output (I/O) interfaces 103 connected to each other by a bus 104. The computers are connected to each other by a network 120. Here, the memories 102 of the computers 110 constitute the shared memory.

Recently, distributed shared memory systems have been built as a cluster of symmetric multi-processors (SMP). In SMP systems, shared memory can be implemented efficiently in hardware since the processors are symmetric, e.g., identical in construction and operation, and operate on a single shared processor bus. SMP systems have good price/performance ratios with four or eight processors. However, because of the specially designed bus, it is difficult to scale the size of an SMP system beyond twelve or sixteen processors.

It is desired to construct large scale distributed shared memory systems using symmetric multi-processors connected by a network. The goal is to allow processes to efficiently share the memories so that data fetched by one process executing on a first SMP from memory attached to a second SMP is immediately available to all processes executing on the first SMP.

In most existing distributed shared memory systems, logic of the virtual memory (paging) hardware typically signals if a process is attempting to access shared data which is not stored in the memory of the local SMP on which the process is executing. In the case where the data are not available locally, the functions of the page fault handlers are replaced by software routines which communicate messages with processes executing on remote processors.

With this approach, the main problem is that data coherency can only be provided at large (coarse) sized quantities because typical virtual memory page units are 4K or 8K bytes. This size may be inconsistent with the much smaller sized data units accessed by many processes, for example 32 or 64 bytes. Having coarse page sized granularity increases network traffic, and can degrade system performance.

In addition, multiple processes operating on the same SMP typically share state information about shared data. Therefore, there is a potential for race conditions. A race condition exists when a state of the system depends on which process completes first. For example, if multiple processes can write data to the identical address, data read from the address will depend on the execution order of the processes. The order may vary on run-time conditions. Race conditions can be avoided by adding in-line synchronization checks, such as locks or flags, to the processes. However, explicit synchronization increases overhead, and may make the system impractical to implement.

It is desired to allow the unit of data transfer between the symmetric multi-processors to vary depending on the size of the accessed data structures. Coherency control for large data structures should allow for the transfer of large units of data so that the time to transfer the data can be amortized. Coherency for smaller data structures should allow the transfer of smaller units of data. It should also be possible to use small units of coherency for large data structures that are subject to false sharing. False sharing is a condition which occurs when independent data elements, accessed by different processes, are stored in a coherent data unit.

SUMMARY OF THE INVENTION

A software implemented method enables data sharing among symmetric multi-processors using a distributed shared memory system using variable sized quantities of data. In the distributed shared memory system, the symmetric multi-processors are connected to each other by a network. Each symmetric multi-processor includes a plurality of identical processors, a memory having addresses, and an input/output interface to interconnect the symmetric multi-processors via the network.

A set of the addresses of the memories are collectively designated as virtual shared addresses to store shared data. Shared data can be accessed by the instructions of programs executing on any of the processors of the symmetric multi-processors as processes. A portion of the virtual shared addresses are allocated to store a shared data structure used by the processes as one or more blocks. Data are fetched and kept coherent at the level of individual blocks.

In one aspect of the invention, the size of a particular allocated block can vary for a particular shared data structure. Each block includes an integer number of lines, and each line includes a predetermined number of bytes of shared data.

Directory information of a particular block is stored in a directory in the memory of a processor designated as the "home" processor. Allocated blocks are assigned to the various processors in a round-robin manner. The directory information includes the size of the particular block, the identity of the processor that last modified the block, and the identities of all processors which have a copy of the block.

Prior to execution, the programs are statically analyzed to locate memory access instructions such as load and store instructions. The programs are instrumented by adding additional instructions to the programs. The additional instructions can dynamically check to see if the target address of load and store instructions access a particular line of the shared data structure, and if the data at the target address has a valid state.

If the data are invalid an access request is generated. In response to receiving the access request from a requesting one of the processors, a particular block including the particular line and the size of the particular block are sent to the requesting processor. The block is sent via the network. This enables the symmetric multi-processors to exchange shared data structures stored in variable sized blocks via the network.

DETAILED DESCRIPTION OF THE PREFERRED EMBODIMENT

System Overview

Figure 1:
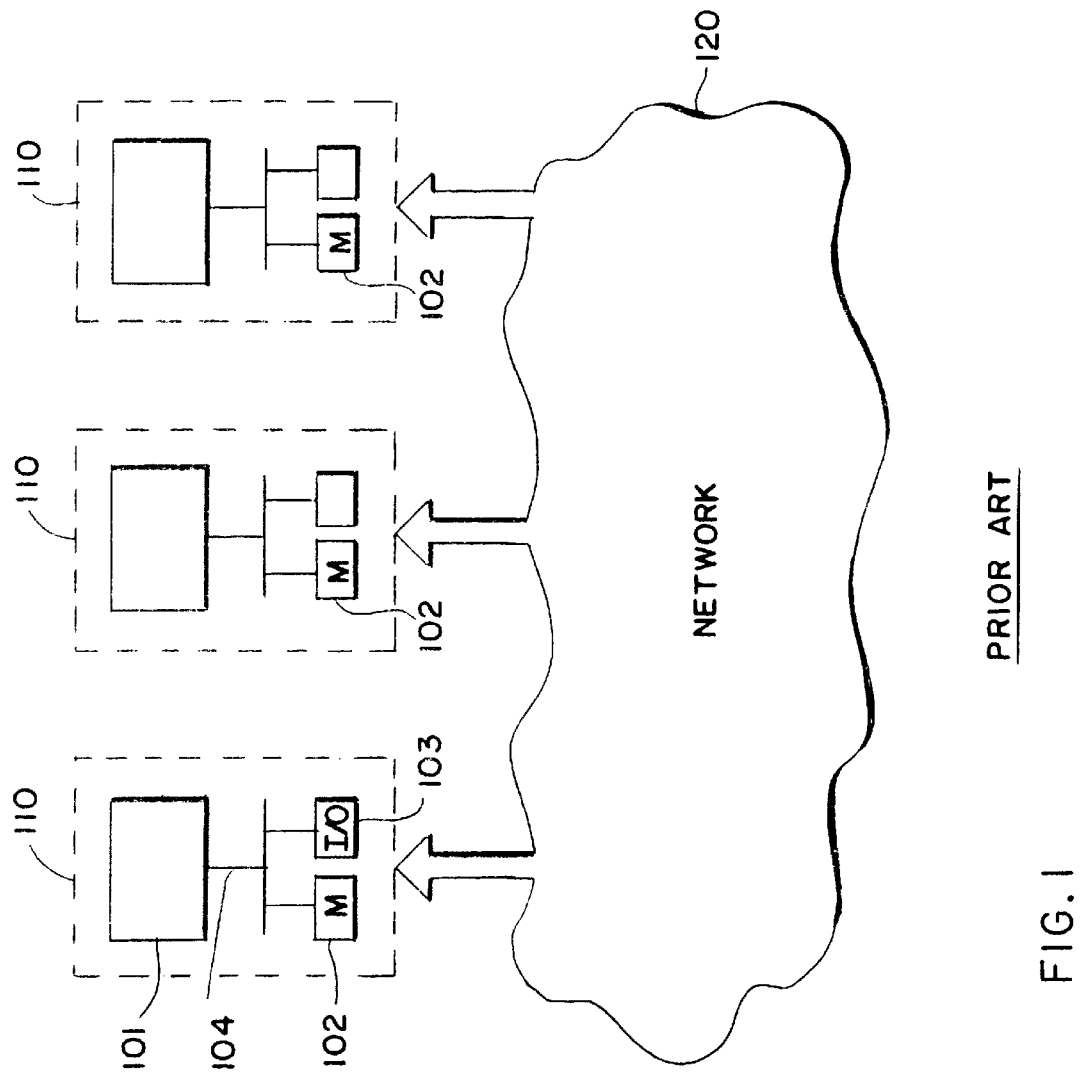
FIG. 1 shows a prior art uni-processor distributed shared memory system.
Figure 2:
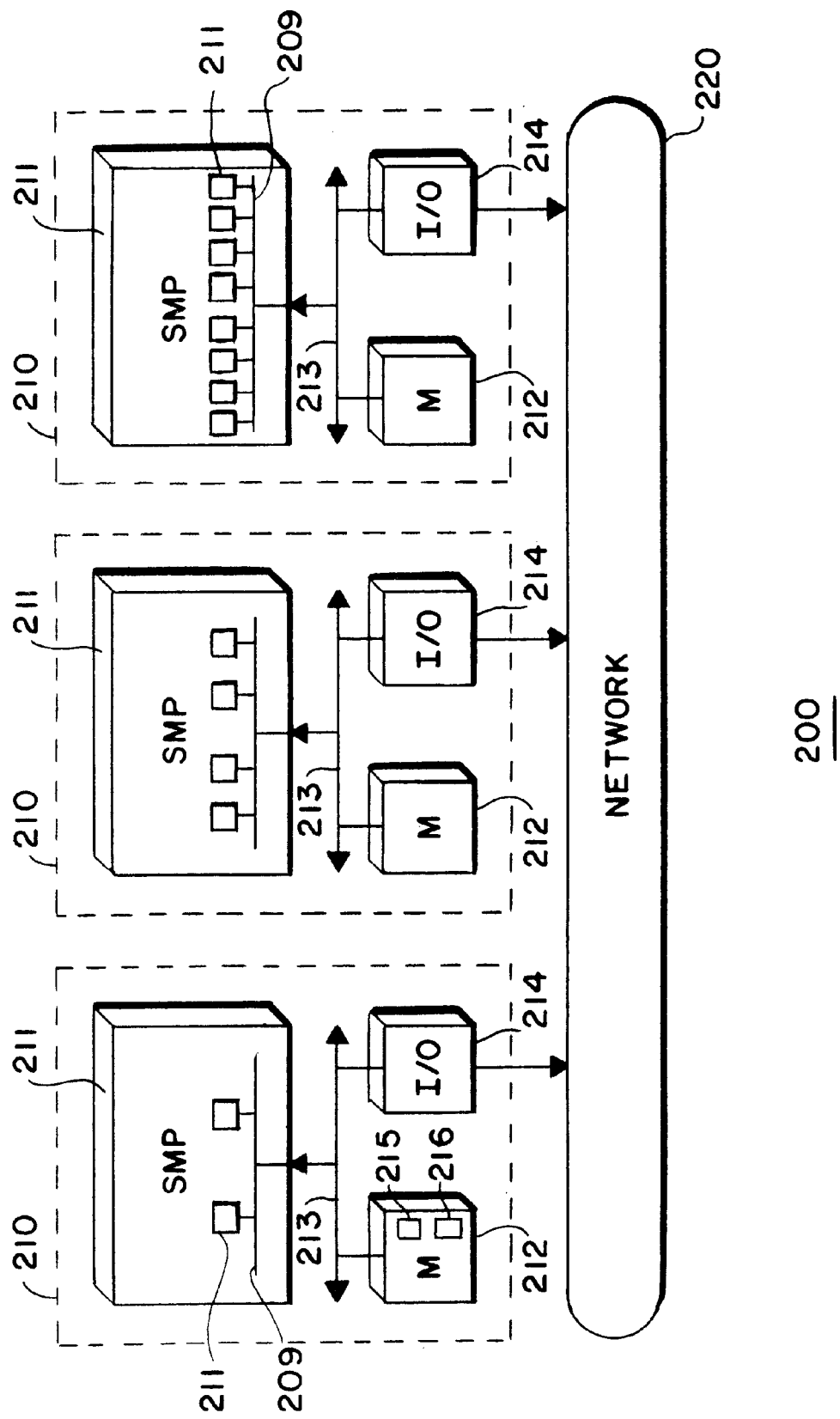
FIG. 2 is a block diagram of a symmetric multi-processor distributed shared memory system according to the invention.

FIG. 2 shows a symmetric multi-processor (SMP) distributed shared memory (DSM) computer system 200 which can use the invention. The DSM-SMP system 200 includes a plurality of SMP systems 210 connected to each other by a network 220. Each SMP system 210 includes two, four, eight, or more symmetric processors 211 connected to each other by a processor bus 209. In addition, each SMP 210 can include memories (M) 212, and input/output interfaces (I/O) 214 connected to the symmetric processors 211 by a system bus 213.

The memories 212 can be dynamic random access memories (DRAM). The memories 212 may include high-speed hardware caches to take advantage of spatial and temporal localities of data. Frequently used data are more likely to be stored in the cache.

The memories 212 store programs 215 and data structures 216. Some of the addresses of the memories 212 can collectively be designated as a single set of shared virtual addresses. Some of the data structures can include shared data. Shared data can be accessed by any process executing on any of the processors 211 of any of the SMPs 210 using the virtual addresses.

The buses 209 and 213 connect the components of the SMPs 210 using data, address, and control lines. The network 220 uses network protocols for communicating messages among the symmetric multi-processors 210, for example, asynchronous transfer mode (ATM), or FDDI protocols. Alternatively, the network 220 can be in the form of a high-performance cluster network such as a Memory Channel made by Digital Equipment Corporation.

General System Operation

During operation of the SMP-DSM system 200, instructions of the programs 215 are executed by the processors 211 as execution threads or processes. The instructions can access the data structures 216 using load and store instructions. It is desired that any of the programs 215 executing on any of the processors 211 can access any of the shared data structures 216 stored in any of the memories 212.

Instrumentation

Therefore, as is described herein, the programs 215 are instrumented prior to execution. Instrumentation is a process which statically locates access instructions (loads and stores) in the programs 215. The instrumentation also locates instructions which allocate and deallocate portions of the memories 211.

Once the instructions have been located, additional instructions, e.g., miss check code, can be inserted into the programs before the access instructions to ensure that memory accesses are performed correctly. The miss check code is optimized to reduce the amount of overhead required to execute the additional instructions. The additional instructions which are inserted for allocation and deallocation instructions maintain coherency control information such as the size of the blocks being allocated.

As stated above, the programs 215 can view some of the addresses of the distributed memories 212 as a shared memory. For a particular target address of the shared memory, an instruction may access a local copy of the data, or a message must be sent to another processor to request a copy of the data.

Access States

With respect to any SMP, the data stored in the shared memory can have two possible states: invalid or valid. The valid state can have substates shared, or exclusive. If the state of the data is invalid, then access to the data is not allowed. If the state is shared, a local copy exists, and other SMPs may have a copy as well. If the state is exclusive, only one SMP has a only valid copy of the data, and no other SMPs can access the data. In addition, as described below, data can be in transition, or "pending."

The states of the data are maintained by coherency control messages communicated over the network 220. The messages are generated by procedures called by the miss check code of the instrumented programs.

Data can be loaded directly from the memory of a local SMP only if the data have a shared or exclusive state. Data can be stored in the local memory only if the state is exclusive. Communication is required if a processor attempts to load data that are in an invalid state, or if a processor attempts to store data that are in an invalid or shared stated. These accesses which require communications are called misses.

The addresses of the memories 212 can be allocated dynamically to store shared data. Some of the addresses can be statically allocated to store private data only accessed by processes executing on a local processor. Overhead can be reduced by reserving some of the addresses for private data, since accesses to the private data by the local processor do not need to be checked for misses.

As in a hardware controlled shared memory system, addresses of the memories 212 are partitioned into allocatable blocks. All data within a block are accessed as a coherent unit. As a feature of the system 200, blocks can have variable sizes for different ranges of addresses. To simplify the miss check code described below, the variable sized blocks are further partitioned into fixed-size ranges of addresses called "lines."

State information is maintained in state tables on a per line basis. The size of the line is predetermined at the time that a particular program 215 is instrumented, typically 32, 64 or 128 bytes. A block can include an integer number of lines.

During the operation of the system 200, prior to executing a memory access instruction, the miss check code determines if the target address is in private memory. If the target address is in private memory, then the miss check code can immediately complete, since private data can always be accessed by a local processor. Otherwise, the miss check code calculates which line of a particular block includes the target address of the instruction, and determines if the line is in the correct state for the access. If the state is not correct, then a miss handler is invoked to fetch the data from the memory of a remote SMP.

Instrumentation Process

Figure 3:
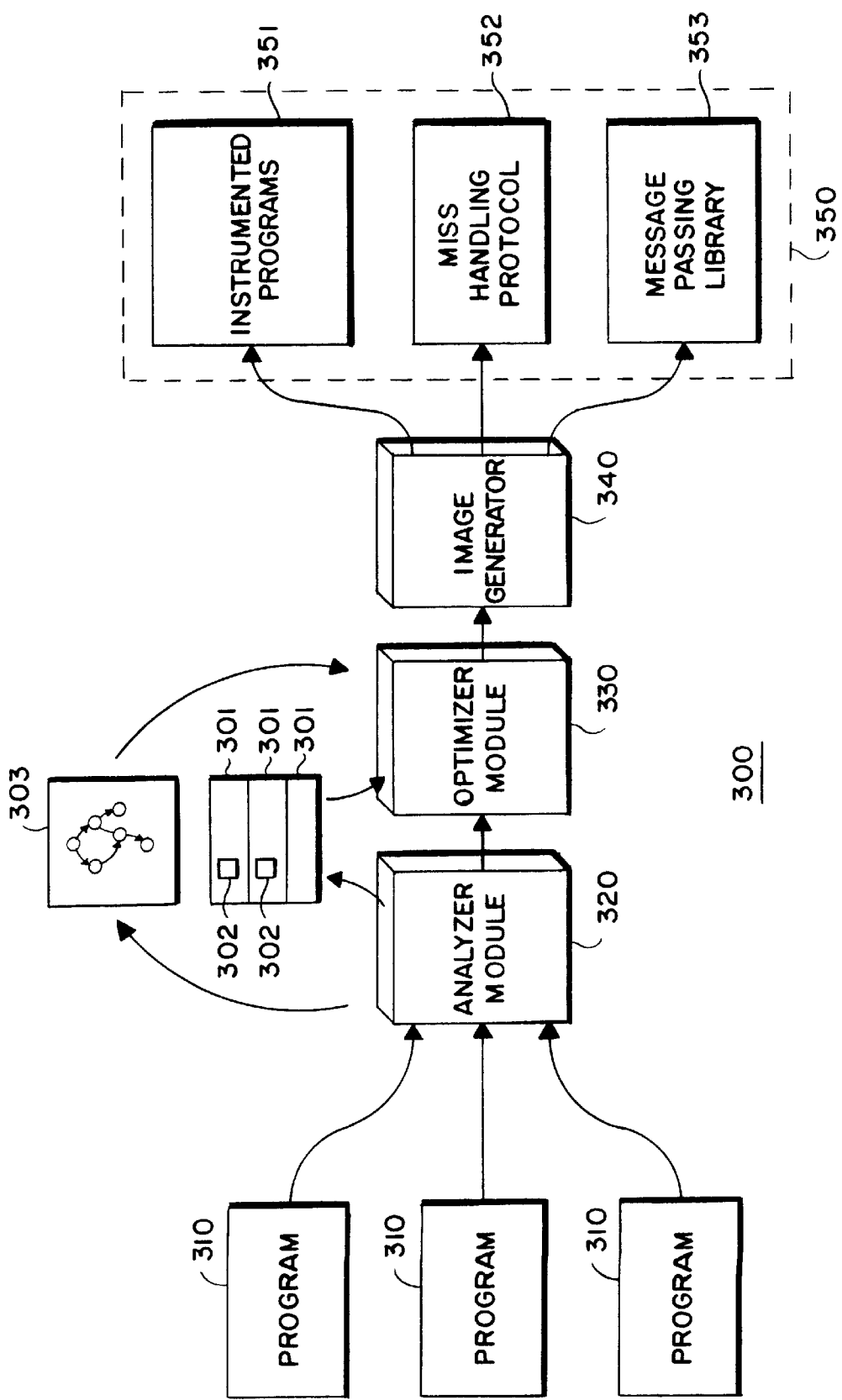
FIG. 3 is a flow diagram of a process to instrument programs.

FIG. 3 shows a flow diagram of a process 300 which can be used to instrument programs so that the amount of overhead required for the additional instructions is reduced. In addition, the process 300 admits coherency control for variable sized data quantities accessed by symmetric multi-processors. The process 300 includes an analyzer module 320, an optimizer module 330, and an executable image generator 340.

Machine executable programs 310 are presented to an analyzer module 320. The analyzer 320 breaks tile programs 310 into procedures 301, and the procedures 301 into basic execution blocks 302. A basic block 302 is defined as a set of instructions that are all executed if the first instruction of the set is executed. The instructions of procedures and the basic blocks are analyzed to form program call and flow graphs 303.

The graphs 303 can be used to determine a data and execution flow of the programs 310. The basic blocks and graphs 303 are analyzed to locate instructions which allocate memory addresses and perform accesses to the allocated addresses. If an instruction accesses shared portions of the memories 212, miss check code is inserted to ensure that the access is performed in a coherent manner.

The miss check code is inserted by the optimizer module 330 as described in further detail below. After the programs 310 have been instrumented, the image generator 340 produces a modified machine executable image 350. The modified image 350 includes instrumented programs 351 with miss check code, miss handling protocol procedures 352, and a message passing library 353. The image 350 can replace the programs 310.

Figure 4:
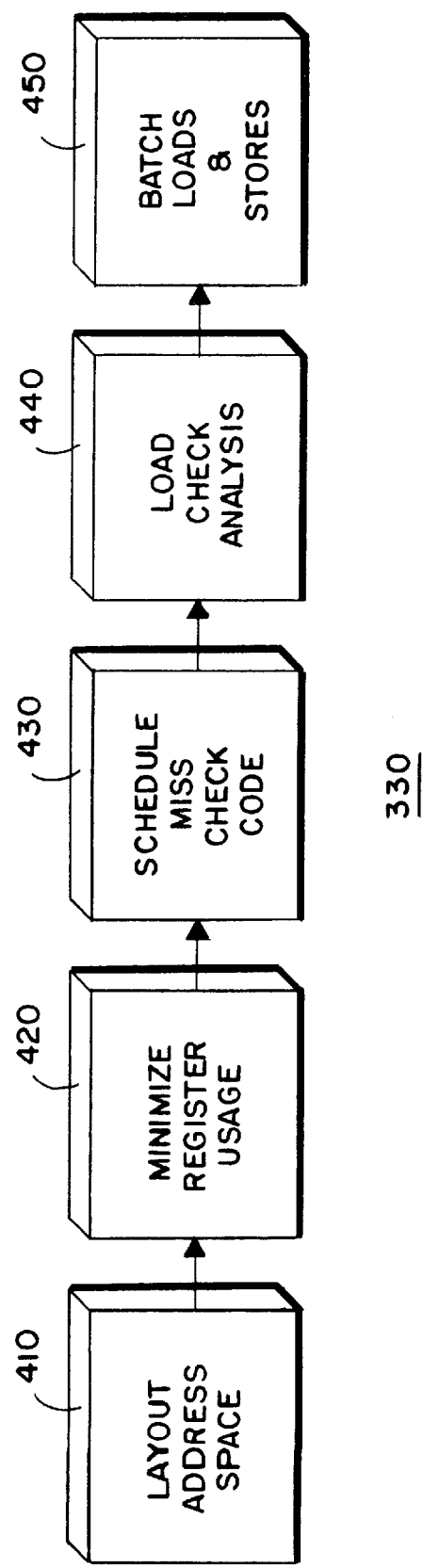
FIG. 4 is a block diagram of optimizing steps.

FIG. 4 shows the steps performed by the optimizer module 330 of FIG. 3. These steps include memory partitioning 410, register analyzing 420, code scheduling 430, load check analyzing 440, and batching 450 steps.

Memory Layout

Figure 5:
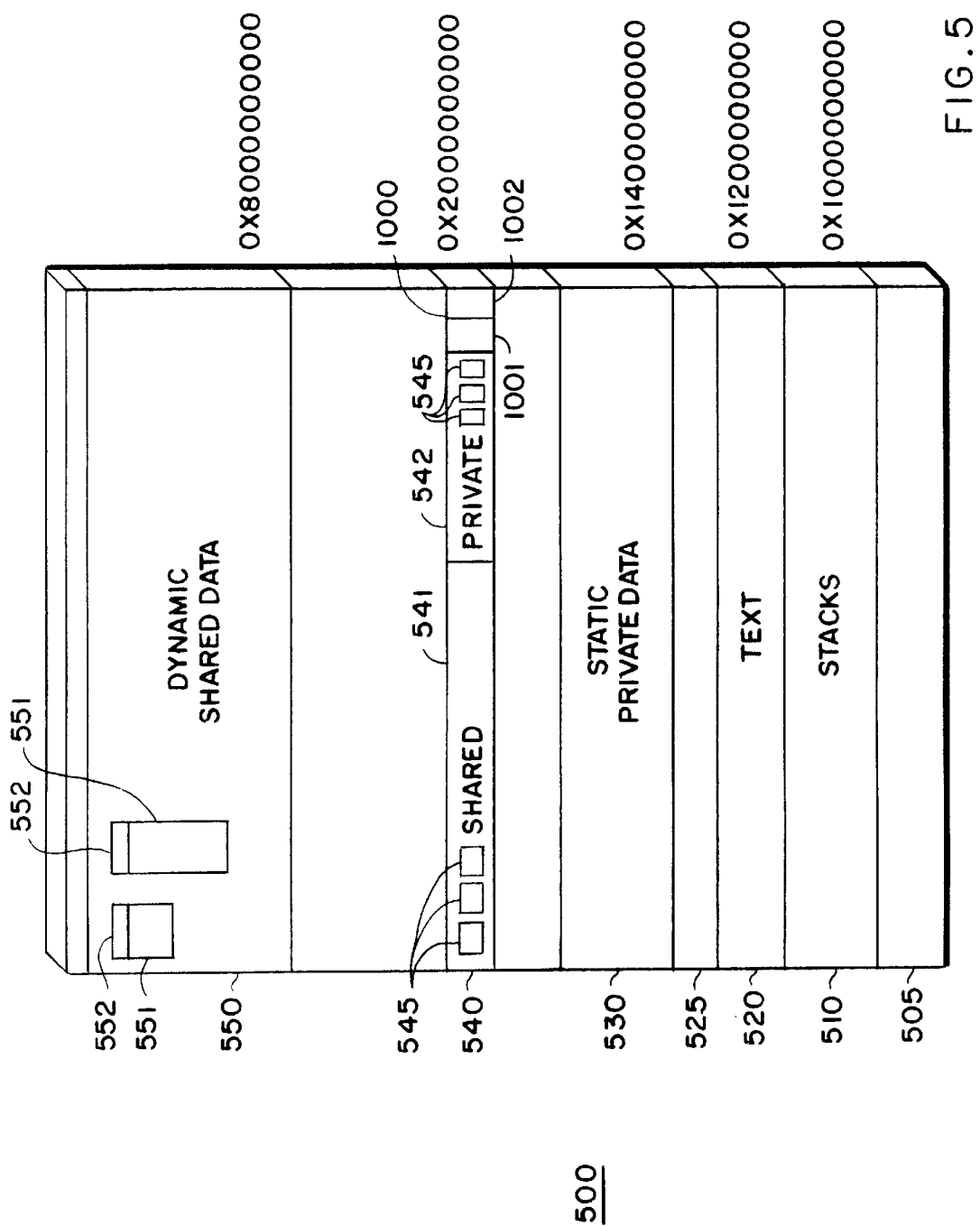
FIG. 5 is block diagram of a memory partitioning.

FIG. 5 shows an allocation of addresses to the memories 212 of FIG. 2. Addresses are increasing from the bottom of FIG. 5 to the top. Addresses are reserved for stacks 510, program text 520, statically allocated private data 530, state tables 540, and dynamically allocated shared data 550.

During operation, addresses used by the stacks 510 decrease towards the stack overflow area 505. The text space 520 is used for storing the executable instructions, e.g., the image 350 of FIG. 3. The addresses assigned for text increase towards the text overflow area 525.

The addresses of the private data section 530 are used to store data structures which are exclusively used by a single local processor, e.g., the data are not shared. The addresses in this portion of memory are statically allocated when a particular program is loaded for execution.

State Tables

The state tables 540 include a shared state table 541, private state tables 542, and exclusion tables 1000. The exclusion tables 1000 can also include a shared 1001 and private 1002 portion.

The shared and private state tables 541 respectively include one byte shared and private state entries 545 for each line of allocated addresses. The bits of the state entries 545 can be used to indicate the various states of the corresponding line of data. One or more lines of data constitute a block.

According to the preferred implementation, all processors 211 of a particular SMP 210 can share the same data. Therefore, the state table entries 545 are shared for all processors of the SMP 210. This means that when a block, e.g., one or more lines of data, is fetched from a remote SMP and the state of the block is changed from invalid to shared or exclusive, the shared memory hardware of the SMP recognizes the state of the data, and any processor 211 of the SMP can access the new data.

Because more than one processor of a particular SMP may concurrently attempt to access a state table entry, the entry is locked before access is made to the entry. The miss checks inserted in the code may also require access to the state table entry. However, in this case, the entry is not locked to decrease overhead. Instead, each processor maintains a corresponding private state table 542 which can be accessed by in-line code without additional overhead.

The entries of the private state tables 542 of the processors are updated by two different mechanisms.

In the case where a processor attempts to access invalid data, a miss condition will occur, and the data are fetched from a remote SMP. Upon receipt, the state of the data becomes valid. This is called "upgrading" the state, because now the data are available, whereas previously this was not the case. However, the data are still marked as invalid in the private state tables of other processors on the same SMP 210.

If one of these other processors now attempts to access the data, the other processor will still see an invalid state in its private state table 542. The other processor can acquire a lock on the shared state table 540 and determine that the data are valid for the local SMP and update its private state table 542 accordingly. Subsequent accesses to data can be performed without having to access the shared state table 540.

In the case where the state of the data needs to be changed back to invalid, e.g., a processor on another SMP needs the data, the state of the data is "downgraded." In this case, the processor receiving the request selectively sends an internal message to other processors executing on the local SMP so that the state maintained in their private state tables 542 can be downgraded. The "downgrading" of a line is not completed until all processors have changed their private state tables.

Note, a race condition may result if the processor receiving the invalidation request were to directly change all the private state tables of all the processors of the local SMP. For example, a race condition would result when a first processor sees a valid state while doing the in-line check for a store, but a second processor downgrades the state of the data to invalid before the first process gets a chance to store the modified data.

One way to avoid race conditions would be to acquire state table locks with the in-line miss check code. However, this approach increases overhead, because of the locking. This is especially true on processors with a relaxed memory model, such as an Alpha processor made by Digital Equipment Corporation. Hence, the use of private state tables is important for efficiently avoiding race conditions.

The use of private state tables 542 not only avoids race conditions in the miss check code, but also reduces the number of messages that need to be communicated while downgrading the state of data within a SMP 210. For example, if a local processor never accesses data that are valid within a local SMP, then its private state table does not need to be updated.

Shared Data

The addresses of the shared data 550 are dynamically allocated by the programs while executing. As an advantage, the addresses of the shared data 550 can be allocated in variable sized blocks 551. The blocks are further partitioned into lines 552.

With the layout as shown in FIG. 5, not all access instructions need to be instrumented. For example, data stored in the program stacks 510 are not shared. Therefore, any instructions which use the stack pointer register (SP) as a base, do not need miss check code applied. Also, any instructions which access private data 530, using a private data pointer register (PR) do not need to be instrumented.

Register Usage

The analyzer module 320 of FIG. 3 uses the graphs 303 and data-flow analysis to track the content of general purpose registers to determine whether values stored in the registers were derived from addresses based on the SP or PR registers. Then, an instruction accessing the stack or private data via a derived address does not need to be instrumented. The analyzer 320 can also locate any registers which are free at the time that the miss check code needs to be applied, which eliminates the need to save and restore the registers used by the miss check code.

By starting the private state table 540 at address 0x2000000000 in each processor's private address space, a shift of the target access address can directly produce the address of the corresponding entry 545 in the private state table 540. Although the layout of the addresses shown in FIG. 5 is for a processor with 64 bit addressing capabilities, it should be understood that the layout 500 can be modified for processors having 32 bit, and other addressing capabilities.

Optimized Miss Check Code

Figure 6:
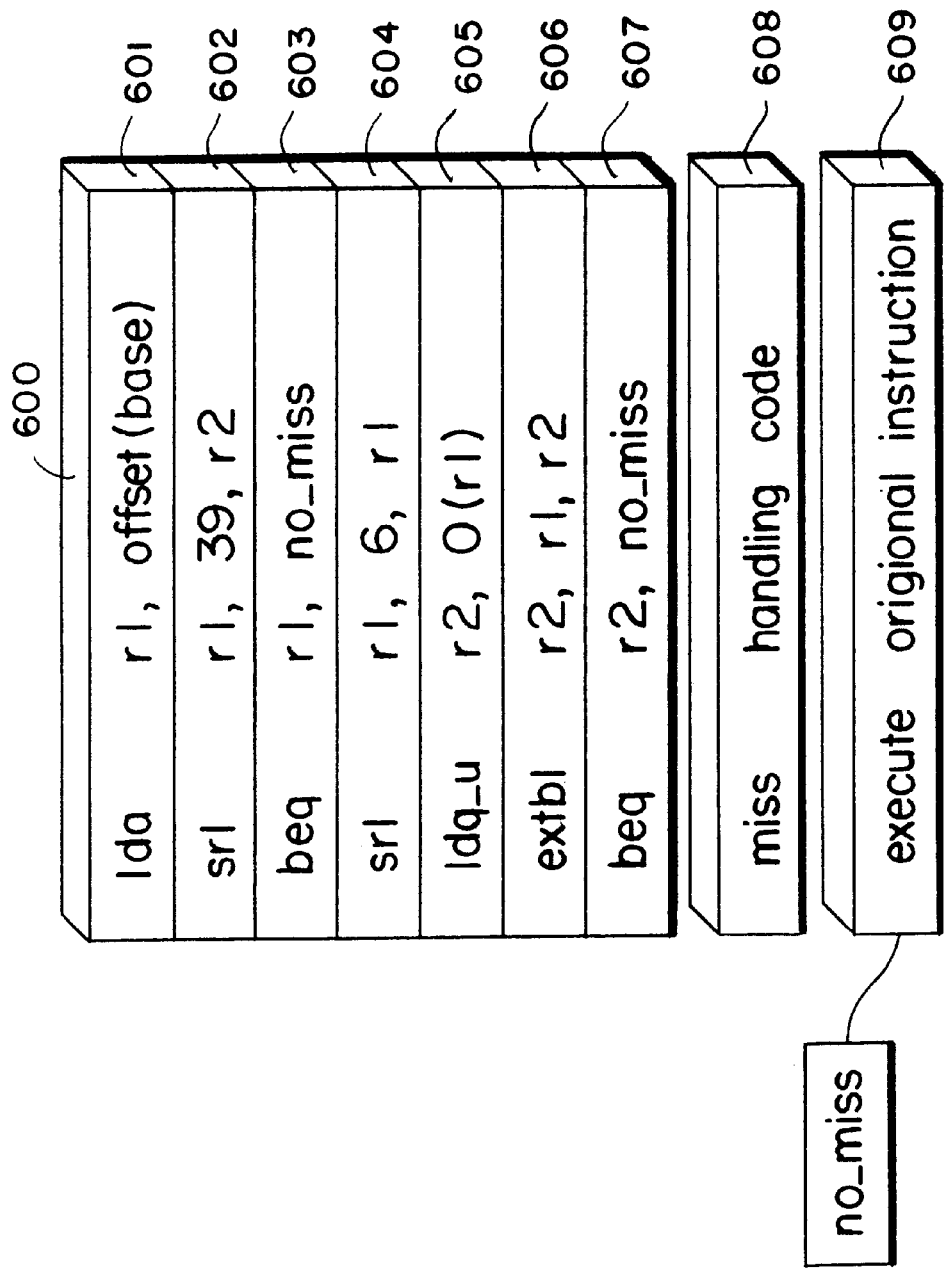
FIG. 6 is a diagram of optimized store miss check code.

FIG. 6 shows miss check code 600 optimized for the memory layout of FIG. 5. The target address for an access can be determined by instruction 601. However, if the target base address has already been established in a register by, for example, a previously executed load or store instruction, then the instruction 601 which loads the targeted base address is not required.

The shift instruction 602 determines if the target address is within the shared data area 550. The branch instruction 603 proceeds directly to execute the original store instruction if this is not the case. The shift instruction 604 produces the address of the entry in the state table corresponding to the line including the target address. By making the value of the state "EXCLUSIVE" be a zero, the need to compare with a constant value is eliminated. Instead, a simple branch instruction 607 can be performed to check for a miss. Instructions 605-606 retrieve the state table entry. The miss handling code 608 is executed in the case of a miss, and the original store instruction is executed at 609.

The miss check code 600 only requires the execution of three instructions if the target address is not in the shared data area. In the case of a shared data access, seven instructions need to be executed.

Code Scheduling

In step 430 of FIG. 4, instruction scheduling techniques can be used to further reduce the amount of overhead used by the miss check code 600. In modem processors that are pipelined and superscalar, the added miss check code can, in many cases, be arranged to introduce minimal pipeline delays, and maximize the potential for multiple instructions being issued during a single processor cycle.

For example, in some processors, there is a one cycle delay before the result of a shift operation can be used. Therefore, if the second shift instruction 604 of FIG. 6 is advanced to occupy the delay slot which results from the first shift instruction 702, the stall between the relocated second shift 703 and the ldq_u instruction 705 is eliminated. This means that the code 700 can complete in fewer machine cycles than the code 600. Note, as for code 600, the need for instruction 701 can be eliminated in many cases. Instructions 705–707 load and check the data state.

Figure 7:
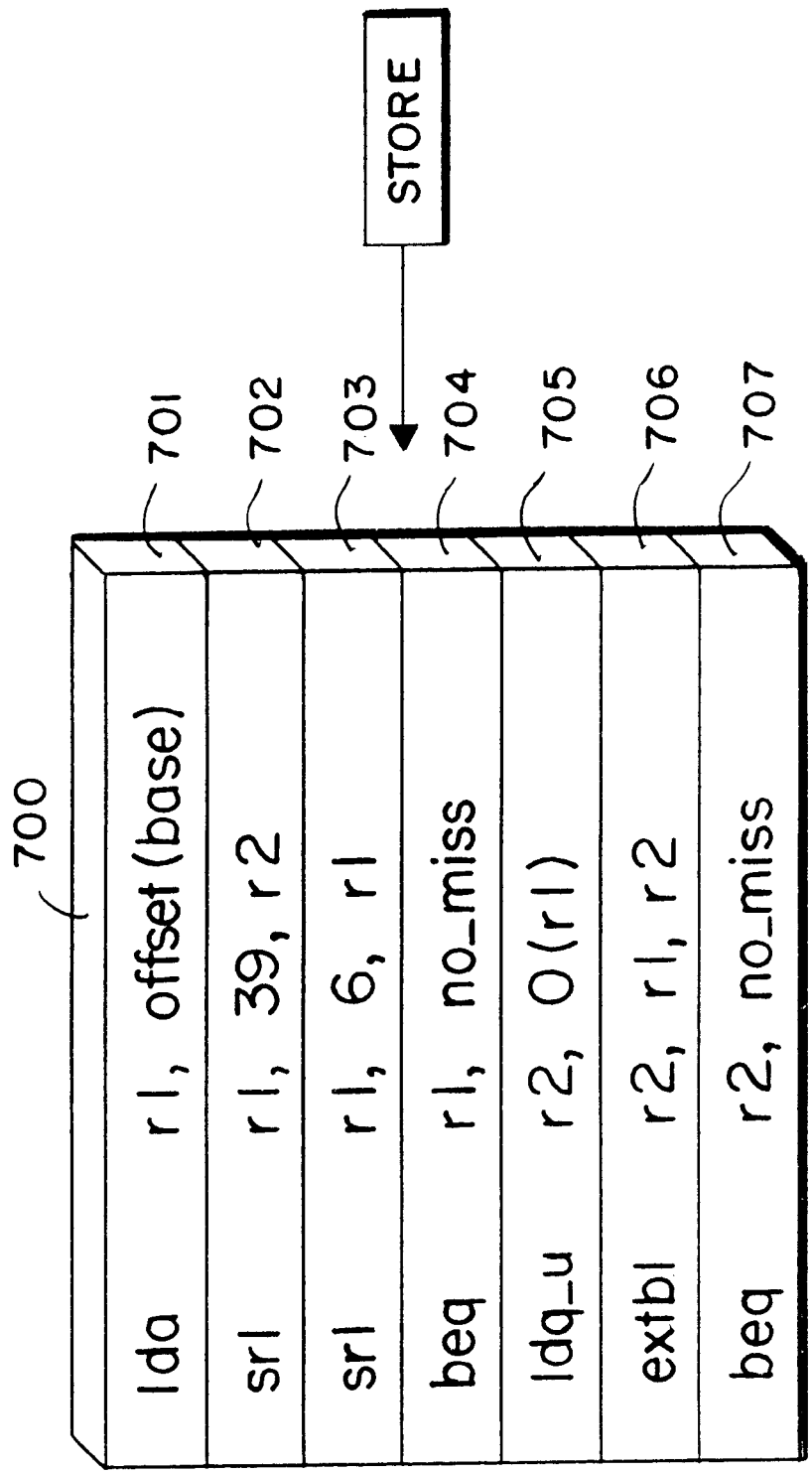
FIG. 7 is a diagram of miss check code arranged for optimal scheduling.

To further reduce overhead in a multiple issue processor, the instructions of the miss check code 700 can be placed so that they are issued during pipeline stalls in the original executable code, or concurrently with the instructions of the executable image. Note, the execution of the first three instructions 701–703 can be advanced in a basic block of instructions as long as the registers (r1 and r2) remain free. In fact, in many cases all three instructions can be advanced sufficiently to completely hide the additional overhead of executing the instructions. Therefore, it clearly is beneficial to arrange the code as shown in FIG. 7.

Store Check

The miss check code can further be optimized when the access instruction is a store instruction 710. In this case, the first three instructions 701–703 are placed before the store instruction 710. The remaining instructions 704–707 are placed after the store instruction 710. This placement is advantageous in the cases where there may be long-latency instructions immediately preceding the store instruction 710 while the program is computing the value to be stored. In this case, the store instruction 710 must stall until the value becomes available. Therefore, the overhead associated with executing the advanced instructions may be completely hidden.

Load Check

Figure 8:
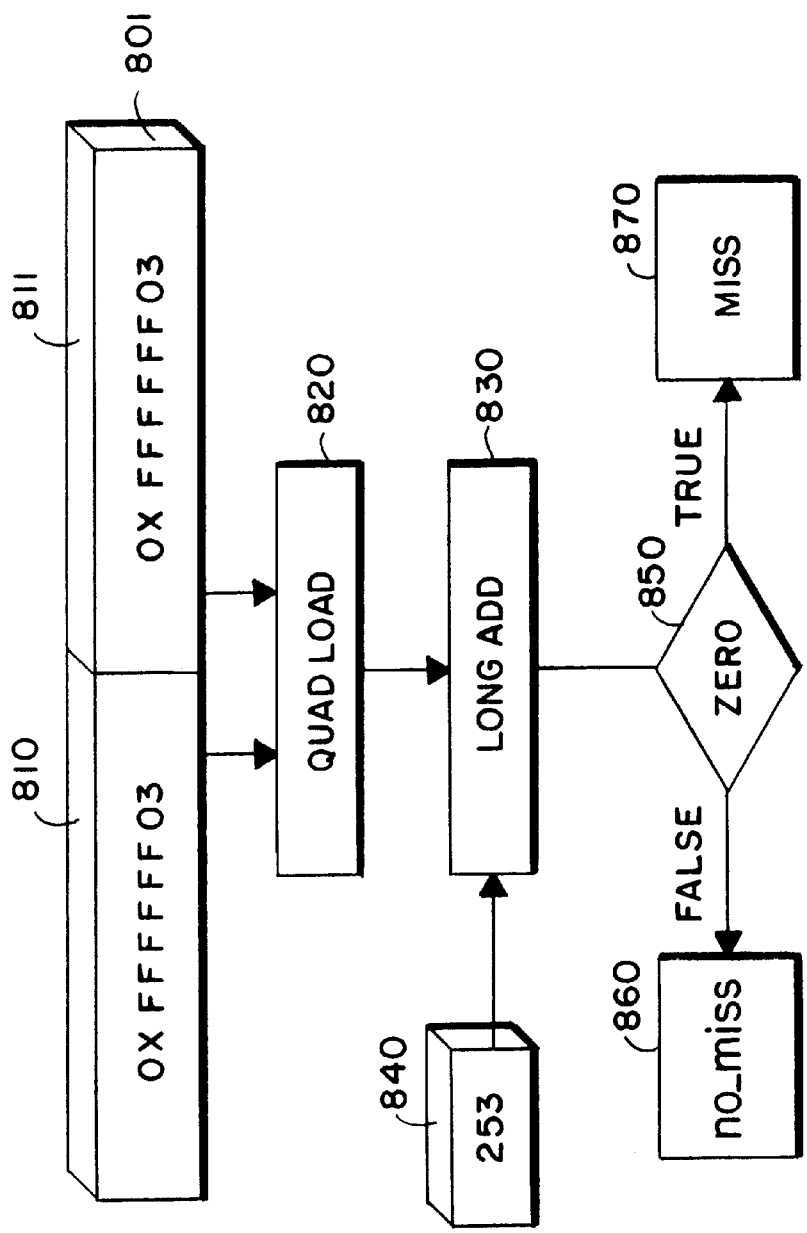
FIG. 8 is a flow diagram of a process to check for invalid data on a load access.
Figure 9:
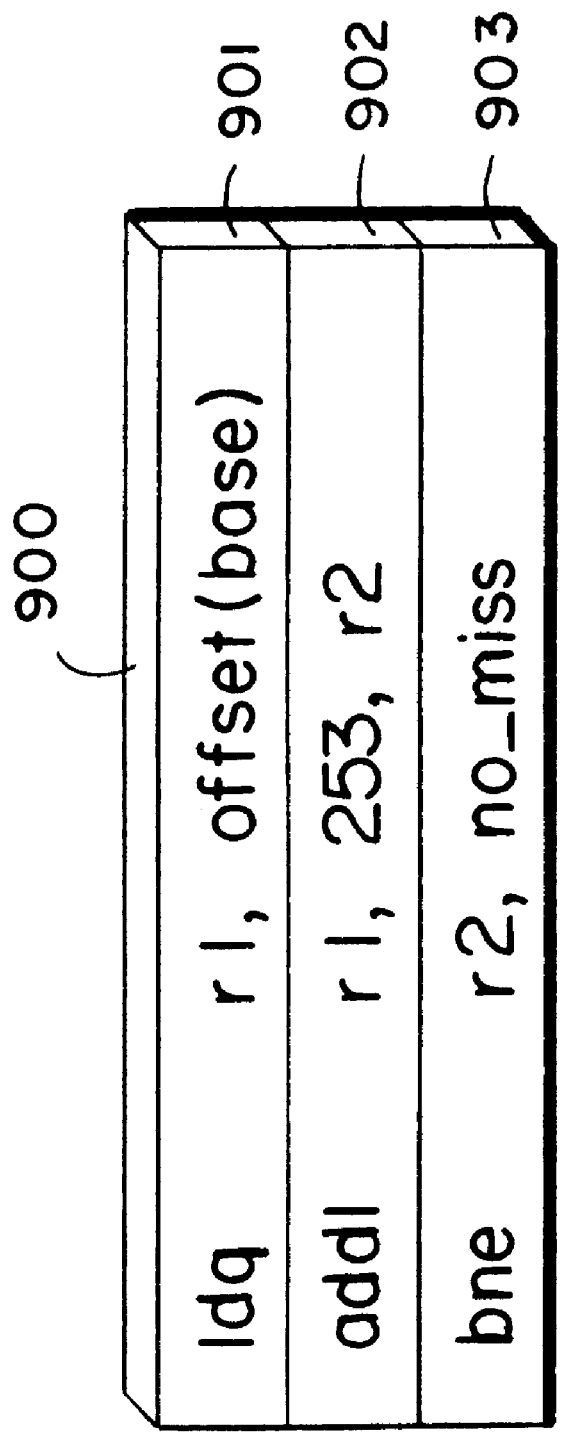
FIG. 9 is a diagram of instructions checking for an invalid flag.

As shown in FIGS. 8 and 9, the data loaded by a load instruction can be analyzed to further reduce the overhead of the miss check code. Whenever data of a line become invalid, a "flag" 801 is stored at all of the addresses 810-811 associated with the line. The flag 801 is, for example, 0xFFFFFF03 (−253). Then, instead of determining the state of a line via the state table entries, the state can, in almost all cases, be determined from the data loaded.

For example, the data at target addresses are accessed with a load instruction 901, step 820. In step 830, add the complement 840 of the flag, e.g., 253. In step 850, check to see if the data loaded from memory likely indicates an invalid state. If true, proceed with the miss code 870, otherwise continue with step 860, no-miss. In the case where there is a presumed miss, the miss code 870 can confirm by checking the entry for the line in the state table 540. This takes care of the rare case where the program actually uses data equal to the flag.

The flag is chosen so that a single instruction 902 can be used to check for invalid data. It is possible that almost any constant could be used. Note, if a zero value is used to indicate an invalid condition, then a simple branch instruction would suffice. However, in cases where a zero or other small integer, e.g., −1, 0, +1, is used, the measured overhead of the miss check code seems to increase due to dealing with a larger number of false misses. In actual practice when using the flag 0xFFFFFF03, false misses rarely occur, therefore, the optimized miss check code 900 as shown in FIG. 9 greatly reduces the miss check code for a load instruction, e.g., two instructions.

Besides reducing the overhead, the flag technique also has other advantages. The main advantage is that the need to examine the state table is eliminated in cases where the load access is valid. Also, the loading of the "flag" data from the target address and the state check are done atomically. This atomicity eliminates possible race conditions between the load instruction and protocol operations for the same address that may be occurring on another processor of the same SMP.

The flag checking technique can also be used for floating point load access instructions. In this case, the miss check code loads the data of the target address into a floating point register, followed by a floating point add and compare. However, on some processors, floating point instructions may have long associated delays. Therefore, floating point miss code can be optimized by inserting an integer load for the same target address, and implementing the flag checking as described above for FIGS. 8 and 9. Even with the additional load instruction, this technique is still more efficient than checking an entry of the state table.

Alternatively, the floating point data can directly be transferred from the floating point register to the integer register, if such an operation is available on the underlying processor.

It should be understood that instruction scheduling can be applied to the instructions of FIG. 9 for load miss code checks. In a preferred implementation, the scheduling step 430 of FIG. 4 attempts to delay the execution of instructions 902 and 903 to avoid a pipeline stall when the value of the load is to be used.

Cache Misses

When loading entries from the state table 540, misses in a cache can be one potential source of increased overhead for the miss check code. If the program has good spatial locality, then the program will not experience many hardware cache misses. If 64 byte lines are used, then the memory required for the state table is only 1/64th of the memory of the corresponding lines. However, if the program does not have good spatial locality, then cache misses on the data, as well as misses on the state table, are more likely.

Exclusion Table

Figure 10:
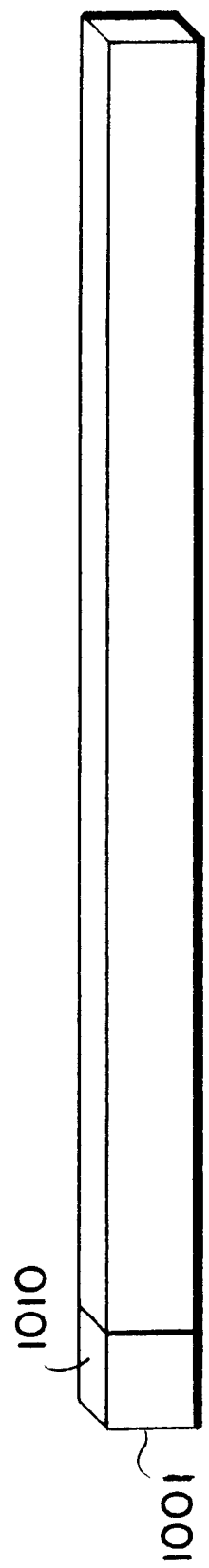
FIG. 10 is a block diagram of an exclusion table.

FIG. 10 shows the shared exclusion table 1001. The private exclusion tables 1002 of FIG. 5, one for each processor, can be similar in construction. The purpose of the exclusion tables 1000 is to reduce hardware cache misses caused by the miss check code loading state table entries for store instructions. The exclusion table 1001 has bit entries 1010, one bit for each corresponding line. A bit is set to a logical one if the corresponding line has the exclusive state, otherwise, the bit is set to a logical zero.

Instead of checking the entries 545 of the state table 540, the store miss check code can examine the bits 1010 of the exclusion table 1000 to determine whether a corresponding line has the exclusive state. If the line does have the exclusive state, then the store can execute immediately.

For sixty-four byte lines, the memory used by the exclusion table 1000 is 1/512 of the amount of memory used by the lines. Therefore, the number of hardware cache misses caused by store miss check code using the exclusion table 1001 can be one eighth of the hardware cache misses that would occur just using the state tables. Note, the use of the exclusion tables 1000 for store miss code checks is enabled, in part, by the invalid flag 801 of FIG. 8. The load miss check code for loads does not have to access the state table 540 in the case where the data are valid. Hence, the exclusion tables 1000 are only accessed by the miss check code for store instructions.

Batching

The batch optimizing step 450 of FIG. 4 recognizes that loads and stores of data are frequently executed in batches relative to a common base register. For example, in programs, it is frequently the case that data are accessed and manipulated in a sequential order according to their addresses. The batch optimizing step 450 detects a set of instructions which access a range of target addresses no greater than the size of one line, e.g., the range is 64 bytes or less. Such a set of load and store instructions can at most access data in two immediately adjacent lines, and in some cases only a single line.

In this case, the miss check code determines if the two lines are in a correct state. If this is true, then all of the load and/or store instructions in the set can be performed without requiring any additional checks. It should be understood that a batch check can also be performed for a range of target addresses which span a single line. However the code which checks for two adjacent lines can check for a single line without a substantial increase in overhead.

As one constraint, the batched load and store instructions cannot be intermingled with other loads and stores which have separate miss check code. Misses induced by other loads and stores may change the state of a line to yield an improper result for the batched load and store instructions. However, loads and stores via multiple base registers can be batched as long as proper miss checks are done for the respective lines referenced via the corresponding base registers.

As another constraint, the base register used by the batch of instructions cannot be modified by a variable while the batch is accessing target addresses in the checked range. This would invalidate the initial check for the batch. It is possible to modify the base register by a constant, since in this case the range check can be performed statically prior to executing the batched access instructions.

The batching technique is always successful in reducing miss check code overhead. However, the technique is especially useful for instructions of a loop which has been "unrolled." An unrolled loop includes instructions which are executed linearly instead of in an iterative circular fashion. Here, access instructions typically work within a small range of a base register that is not modified during the iterations. In this case, the batching technique can nearly always be applied, and is very effective.

Although batching is always attempted for instructions of a single basic block, it may also be possible to perform batching for load and store instructions which span several basic blocks. When loads and stores across several basic blocks are batched, there are additional constraints. The batched set of instructions cannot include any subroutine calls, since these calls may cause the execution of loads and stores having unknown target addresses in the called subroutines. Also, the batched instructions cannot include a loop, since the number of times the loop is repeated cannot be determined until the instructions of the batch are executed. Furthermore, in a batch including conditional branches, a store which occurs in one of the branched execution paths must occur in all paths. Only then can it be determined which store accesses have been performed when the batched instructions are executed.

The batching process can arbitrarily batch many loads and stores relative to any number of base registers, and across one or more basic blocks.

A "greedy" batching algorithm can be used. The greedy algorithm locates as many load and store instructions as possible to include in a batch. The algorithm completes when a terminating condition, as described below, is reached. If there is only a single load or store instruction in a batch, then batched miss check code is not used.

If a conditional branch instruction is encountered which results in two possible execution paths, then both paths are examined for instructions to include in a batch. The scanning of the two separate execution paths is merged when the execution of the two paths merge.

Terminating conditions can include: a load or store instruction which uses a base register which is modified by a variable; a load or store instruction which has a target address outside the lines being checked; a subroutine call; a conditional branch instruction which causes a loop, e.g., a re-execution of one or more instructions; the end of a subroutine is reached; a store instructions in one of several branches; and the scanning of one branch which merges with a parallel branch, but scanning of the parallel branch has already terminated.

Miss Check Code for Batches of Instructions

Figure 11:
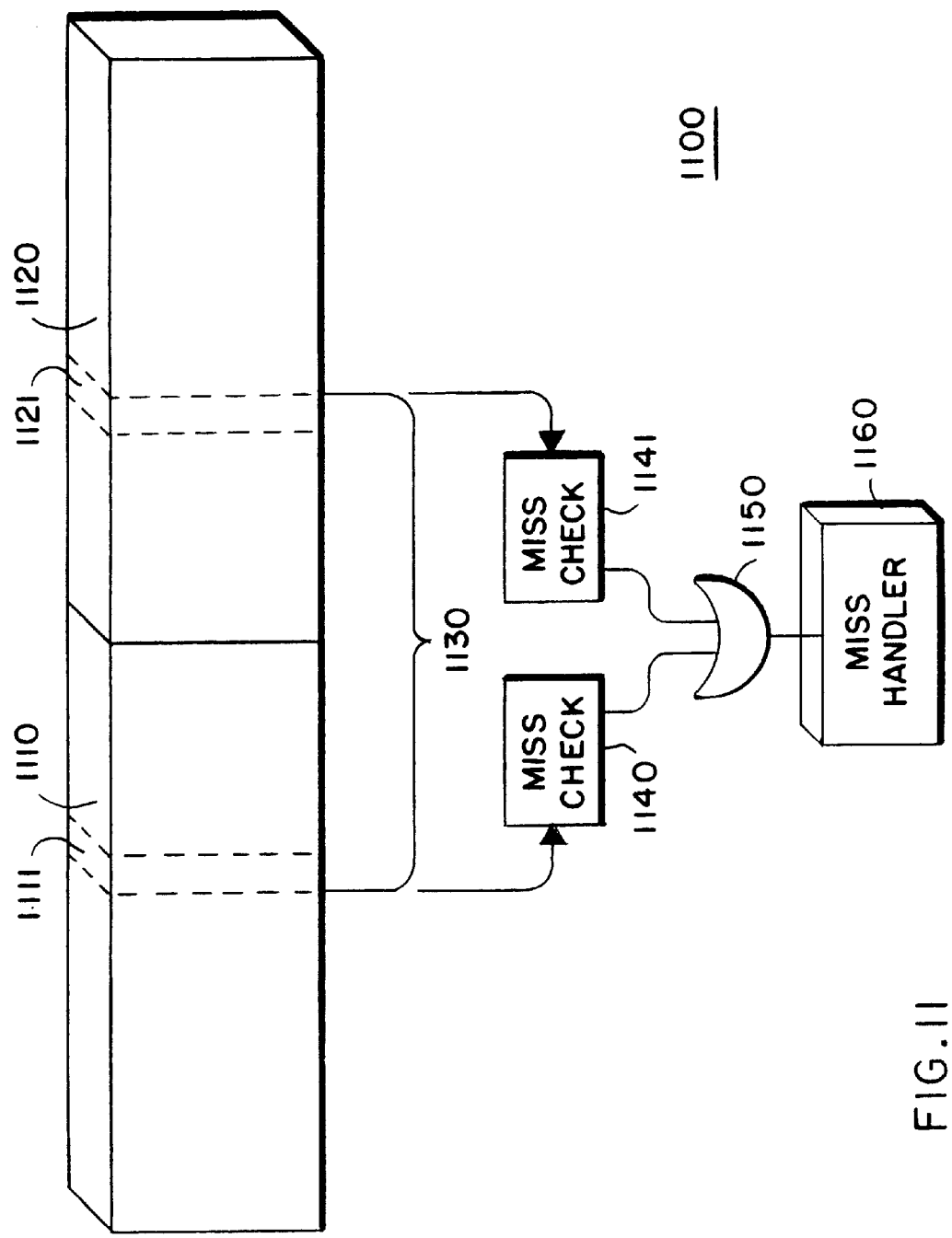
FIG. 11 is a block diagram of a process for checking for batches of access instructions.
Figure 12:
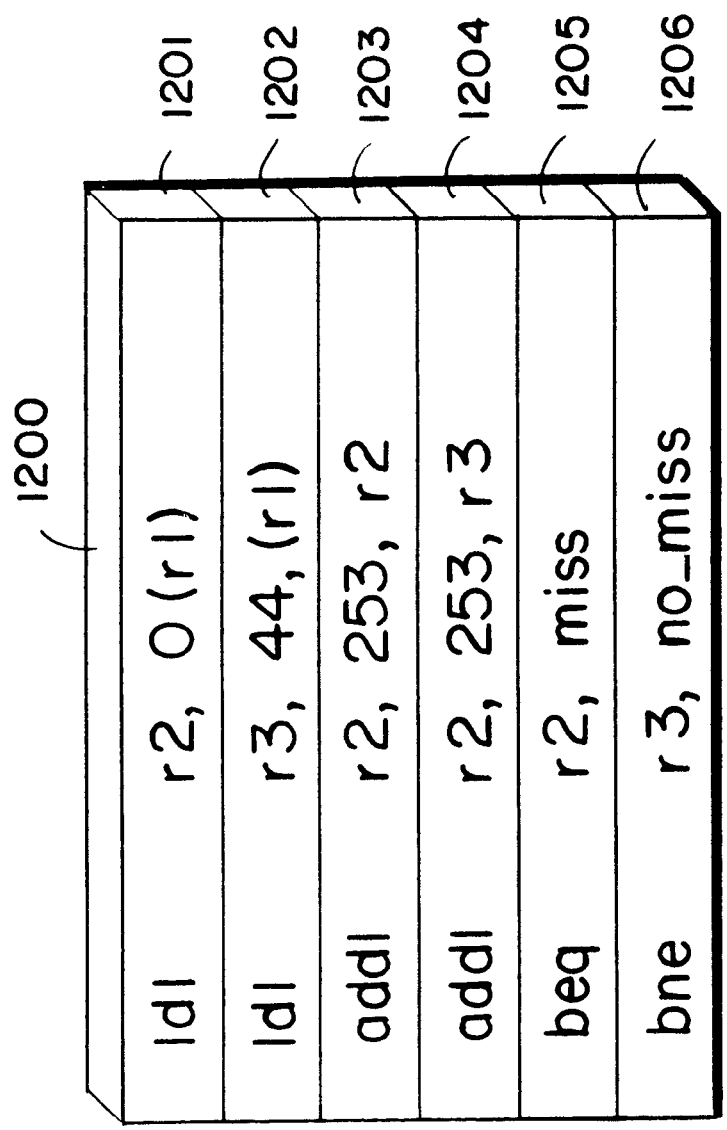
FIG. 12 is a diagram for instructions which implement the process of FIG. 11 and as arranged for optimal scheduling.

FIGS. 11 and 12 respectively show the flow 1100 and miss check code 1200 for a group of batched load instructions which access a range of target addresses 1130. One convenient way to check the range 1130 is to perform miss code checking 1140-1141 on the first address 1111 and the last address 1121 of the range 1130 of addresses accessed by the set of access instructions. The first and last addresses must respectively be in the first and last lines 1110 and 1120, see instructions 1201–1204. The instructions 1205 and 1206 check for the invalid flag.

If either address 1111 or 1121 are invalid (1150), then the miss handling code 1160 is called. If both the first and the last addresses store valid data, all of the instructions of the set can be executed without any further checking. As an advantage, the miss check code 1200 for the endpoint addresses can be interleaved with each other to effectively eliminate pipeline stalls.

Message Passing Library

The message passing library 353 of FIG. 3 provides the necessary procedures to allow the symmetric multi-processors 210 to communicate over the network 220. For example, if the network 220 uses ATM protocols, the routines of the library 353 communicate ATM type of messages. The routines of the library 353 can send and receive messages of an arbitrary size. In addition, the routines can periodically check for incoming messages.

Miss Handling Protocol

The other code which is linked to the instrumented program 351 of FIG. 3 is the miss handling protocol code 352. This code can fetch data from the memory of another symmetric multi-processor, maintain coherence among shared copies of data, and ensure that a processor which is attempting to store data has exclusive ownership of the data.

The protocol code 352 also implements synchronization operations such as "locks" and "barriers." The code 352 is called whenever the miss check code detects a load or store miss, or when a synchronization operation is required.

The protocol code 352 is a directory-based invalidation protocol. For each block 551 of shared data 550 of FIG. 5, one of the processors is assigned to be the "home" processor. Blocks can be assigned to different home processors in a round-robin manner, e.g., in turn of allocation. Blocks can be explicitly assigned to a particular processor if placement hints are supplied by one of the programs 310 of FIG. 3.

A home processor is responsible for initializing the data stored at addresses of the block. The home processor also establishes the initial states of the lines of the allocated block, for example the state can reflect an exclusive ownership. The home processor also creates the initial directory information about the block.

The directory also indicates, as described below, which processors have a copy of a block assigned to the home processor. When a processor, other than the home processor, desires to access data of the block, it sends a message to the home processor indicating that it either wants to load or store data of the block. In the case of a store, an ownership request is also sent.

Home Processor Directory

Figure 13:
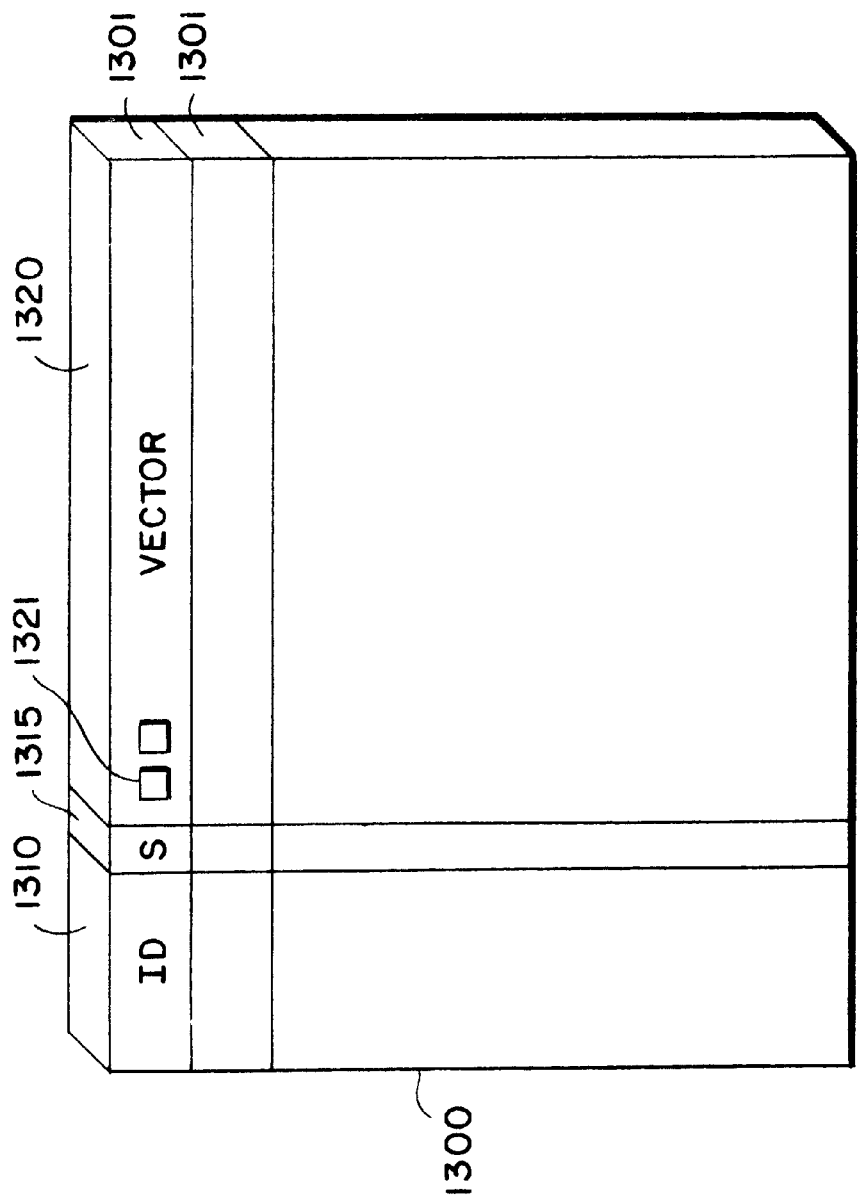
FIG. 13 is a block diagram of a block directory.

As shown in FIG. 13, each processor 210 maintains a directory 1300 which can store information about lines contained in blocks for which the processor is the home. Also, at any one time, each line of a particular block has a "controlling" processor. The processor which controls a line can be the processor that last had exclusive ownership over the line.

For each block owned by a home processor, the directory 1300 has an entry 1301 for each line in the block. Each entry 1301 includes an identification (ID) 1310, a block size 1315, and a bit vector 1320. The ID 1310 indicates which processor currently controls the block, and the vector 1320 has one bit 1321 for each processor having a copy of the block. The size of the block 1315, as described in further detail below, can be varied.

Protocol Messages

The processors 211 communicate messages with each other via the network 220 of FIG. 2. The messages are of the following general types. Request messages can request copies of data for the purpose of loading and storing, and reply messages can include the requested data. Requests for data are typically sent to the home processor. If the home processor does not have a copy of the data, then the request is forwarded to the controlling processor. The controlling processor can reply directly to the processor which issued the request.

Some messages are also used for process synchronization. Two types of synchronization mechanisms can be used. First, processors can be synchronized to a specified "barrier" address. When synchronizing on a barrier address, processors having reached the barrier address wait until all other processors have also reached the barrier address.

Another type of synchronization is via a lock. A "lock" can be exercised by any processor on a specified address of the shared memory. Another processor cannot exercise a lock on the same address until the lock is released.

The details of the messages supported by the miss handling code 352 are as follows.

Read Message

A read message requests data for a specified processor to read. This message includes the address of the block which stores the requested data and an identity of the requesting processor. In response to the message, the entire block including the requested data is fetched.

Write Message

The write message includes the address of the requested data, and an identity of the requesting processor. This message requests a block of data for the purpose of storing new data in the block when the requesting processor does not have a copy of the data. Therefore, the message also requests ownership of the block of data.

Ownership Message

This message requests ownership of data in the case where the requesting processor does have a copy of the data. This message is used if the requesting processor decides to modify its copy of the data. The ownership message includes the address of the data, and an identity of the requesting processor.

Clean Message

This message is used to communicate a request for a (clean) read-only copy of the data. The clean message includes the address of the requested data, the number of bytes, and an identity of the requesting processor. As an optimization, the request does not have to be forwarded to another processor if the home processor has a copy of the requested data.

Forward Message

This message requests that a writable copy of the data be forwarded from the processor currently controlling the data to the processor which made a request for the data. The forward message includes the address of the requested data, the number of bytes, and an identity of the requesting processor.

Invalidate Message

This message requests that a copy of the data be invalidated. When the invalidation has been completed, an acknowledgement is sent to the requesting processor. The invalidate message includes the address of the requested data, the number of bytes to be invalidated, and an identity of the requesting processor.

Downgrade Message

This message is sent locally within an SMP, when the state of a block is downgraded, to processors whose private state tables must also be downgraded. The downgrade message includes the type of downgrade, the address of the requested data, the number of bytes, and the identity of the requesting processor. The last processor that receives the downgrade message completes the action associated with the request that initiated the downgrade.

Clean Reply Message

This message includes a copy of the actual data requested in the clean message. The clean reply message includes the address of the requested data, the number of bytes, and the data.

Forward Reply Message

This message includes a writable copy of the requested data. The forward reply message includes the address of the requested data, the number of bytes, and the data.

Invalidate Reply Message

This message is an acknowledgement that the data were invalidated. The invalidate reply message includes the address of the requested data, and the number of bytes that were invalidated.

Barrier Wait Message

This message requests notification to the requesting processor when all processors have reached a specified barrier address. The barrier wait message includes the barrier address, and the identity of the requesting processor.

Barrier Done Message

This message indicates that the conditions of the barrier wait message have been satisfied. The barrier done message includes the barrier address.

Lock Message

This message requests ownership of a lock. In the present implementation the lock is exercised on a specified address of the shared memory. The data stored at the address is of no concern with respect to the lock message. The lock message includes the address associated with the lock.

Lock Forward Message

This message forwards a lock request to a processor currently controlling the locked address. The lock forward message includes the lock address.

Lock Reply Message

This message transfers control for the locked address to the requesting processor. The lock reply message includes the locked address.

Dirty Data

The protocol messages described above allow the sharing of "dirty" data. This means that the home processor of a block is not required to have a clean, up-to-date copy of data.

For example, another processor could have modified its copy of the data, and subsequently shared the modified copy of the data with processors other than the home processor. This feature makes the need for write-backs to the home processor optional. Otherwise, a write-back to the home processor is required whenever a processor reads a copy of dirty data from another processor.

Polling

A polling mechanism is used to process the messages generated by the processors 211. For example, the network 220 is polled for an incoming message when a processor is waiting for a response to a request message. This avoids a deadlock situation.

In addition, in order to ensure reasonable response times for requests, the programs are instrumented to poll for incoming messages whenever the programs make a function call. If the network 220 is of the type which has short latencies, polling can be on a more frequent basis, such as on every program control back-edge. A program control back-edge can be a branch type of instruction which causes a loop to be iteratively re-executed. Therefore, back-edge polling is done for each iteration of a loop.

Messages could be serviced using an interrupt mechanism. However, servicing an interrupt usually takes longer to process, since the state which exists at the time of the interrupt must first be saved and subsequently be restored. Also, with polling, the task of implementing atomic protocol actions is simplified.

Because of the relatively high overhead associated with sending messages between processors, extraneous protocol coherence messages are minimized. Because a home processor of a block guarantees the servicing of the request by forwarding the request to the currently controlling processor, all messages which change information in the directory 1300 can be completed when the messages reach the home processor. Thus, there is no need to send an extra message to confirm that a forwarded request has been satisfied. In addition, all invalidation acknowledgements generated in response to exclusive requests are directly communicated to the requesting processor, instead of via the home processor.

Lock-up Free Cache

The protocol 352 also provides a release consistency model which is substantially equivalent to a hardware type of lock-up free cache which allows non-blocking loads and stores. Data that are "cached" in the distributed shared memories can have any one of the following states: invalid, shared, exclusive, pending-invalid, or pending-shared. The pending states are transitory states of a line when a request for the block including the line is outstanding. The pending-invalid state exists for data having an outstanding read or write request. The pending-shared state exists for data with an outstanding ownership request.

Non-blocking stores are supported by having a processor continue processing instructions after a request for data has been made. While the request is outstanding, the protocol notes the addresses of any data that are modified in the local copy of the block. Then, when the requested block of data becomes available, the modified data can be merged with the requested data. It should be noted that the batching of loads and stores described above enables non-blocking loads since the batching of loads can lead to multiple outstanding loads for a single check.

Lock-up free behavior can also be supported for data that have a pending state. Storing data at addresses of pending data can be allowed to proceed by noting the addresses where the data are stored, and passing the addresses to the miss handing code 352 of FIG. 3.

All stores to a block in a pending state are completed inside the protocol routine while a lock is held on the appropriate state table entry. This method of doing pending stores is important to ensure that the stores are made visible to any processor that may later do a protocol operation on the same block.

Loads from addresses of data having a pending-shared state are allowed to proceed immediately, since the processor already has a copy of the data. Loads from addresses of data of a block having the pending-invalid state can also proceed, as long as the loads are from addresses of a line of the block that stores valid data. Valid loads to pending lines proceed quickly because of the use of the invalid flag 801 of FIG. 8. A valid load to a pending line can proceed immediately because the loaded value is not equal to the invalid flag.

Variable Granularities

As a feature of the protocols as described herein, variable granularifies for coherency are possible, even within a single program, or a single data structure. Variable granularities are possible because all checks for misses are performed by software instructions accessing data at very small granularifies, e.g., bytes, long words, and quadwords. In contrast, other distributed memory systems use virtual memory hardware to do miss checks at fixed and coarse granular addresses determined by virtual memory page size, typically 4096 or 8192 bytes.

Different types of data used by a program are most naturally, and efficiently accessed at variable granularities. For example, blocks of data read from and written to bulk sequential addresses of input/output devices are best dealt with in coarse granularities, e.g., 2K, 4K etc. However, many programs also require random access to ranges of addresses which are considerably smaller, e.g., 32, 256, 1024 bytes.

Allowing application programs and data structures to have variable access granularities can improve performance because data can be communicated in the most efficient units of transfer. Data having good spatial locality, e.g., data "clumped" into blocks, can be transported at coarse granularities to amortize the time of long communications latencies. In contrast, data subject to "false sharing" can be communicated at finer granularities.

False sharing is a condition where independent portions of data, for example, array elements, are stored in the data structure, e.g., one or more blocks, and accessed by multiple symmetric multi-processors. Variable sized blocks, eliminates the need to repeatedly transfer large fixed size quantities of data including smaller independent portions of false shared data between the symmetric multi-processors.

Accordingly, the process 300 of FIG. 3 is optimized to process units of data transfer having variable granularities. A unit of data transfer, e.g. a block, can be any integer multiple of lines, depending on the fixed line size chosen for the program, e.g., different programs can access data having different line sizes (32, 64, 128 byte lines).

In order to choose an appropriate block size for any particular data structure, a heuristic based on the allocated size can be used. The basic heuristic chooses a block size equal to the size of the allocated data structure, up to a predetermined threshold size of the data structure, for example, 1K or 2K bytes. For allocated data structures which are larger than the predetermined threshold size, the granularity can simply be the size of a line. The rationale for the heuristic is that small data structures should be transferred as a unit when accessed, while larger data structures, such as arrays, should be communicated at fine granularities to avoid false sharing.

The heuristic can be modified by inserting special allocation instructions in the programs which explicitly define the block size. Since the size of allocated blocks does not affect the correctness of the program, the appropriate block size for maximum performance can be determined empirically.

As shown in FIG. 13, the block size 1315 of an allocatable piece of data is maintained by the home processor in a directory 1300. Each line entry includes the size 1315 of the corresponding block. Processors become aware of the size of a block when data of the block are transported to a requesting processor.

Because processors do not need to know the size of blocks, the sizes can be determined dynamically. For example, a home processor can change the granularity of an entire data structure by first invalidating all lines which comprise the data structure, and then changing the block sizes in the directory entries 1301.

The home processor can look up the size of a block when an access request, e.g., read, write, ownership, for data at a target address of a particular line is received. Then, the home processor can send the correct number of lines comprising the entire block to the requesting processor. Any other copies of the lines can be appropriately handled by the processor using the vector 1320. In reply to any access request, other than the initial request, all protocol operations are performed on all lines of the block.

In order to simplify the miss check code, the states of pieces of data are checked and maintained on a per-line basis. However, the protocol 352 ensures that all lines of a block are always in the same state. Therefore, the in-line miss check code can efficiently maintain states for variable sized blocks.

In the case of variable sized granularities, a processor may not know the size of a block containing a requested line. For example, a processor requests to access data at address A, and address A+64. In the case where the processor does not know the size of blocks, it may make two requests assuming a line size of 64 bytes, one for each target address, even if the addresses are in the same block.

However, as an advantage, the protocol as described herein transfers in a single message the entire block containing the lines. Subsequently, the home processor processing the initial request can also recognize that the second request is not needed. This is true in all cases, except when another processor makes a request for access to the first line, before the request for the second line is fully processed. In this case, the second request must be treated as an initial request, since the current states of the data are not always determinable.

Figure 14:
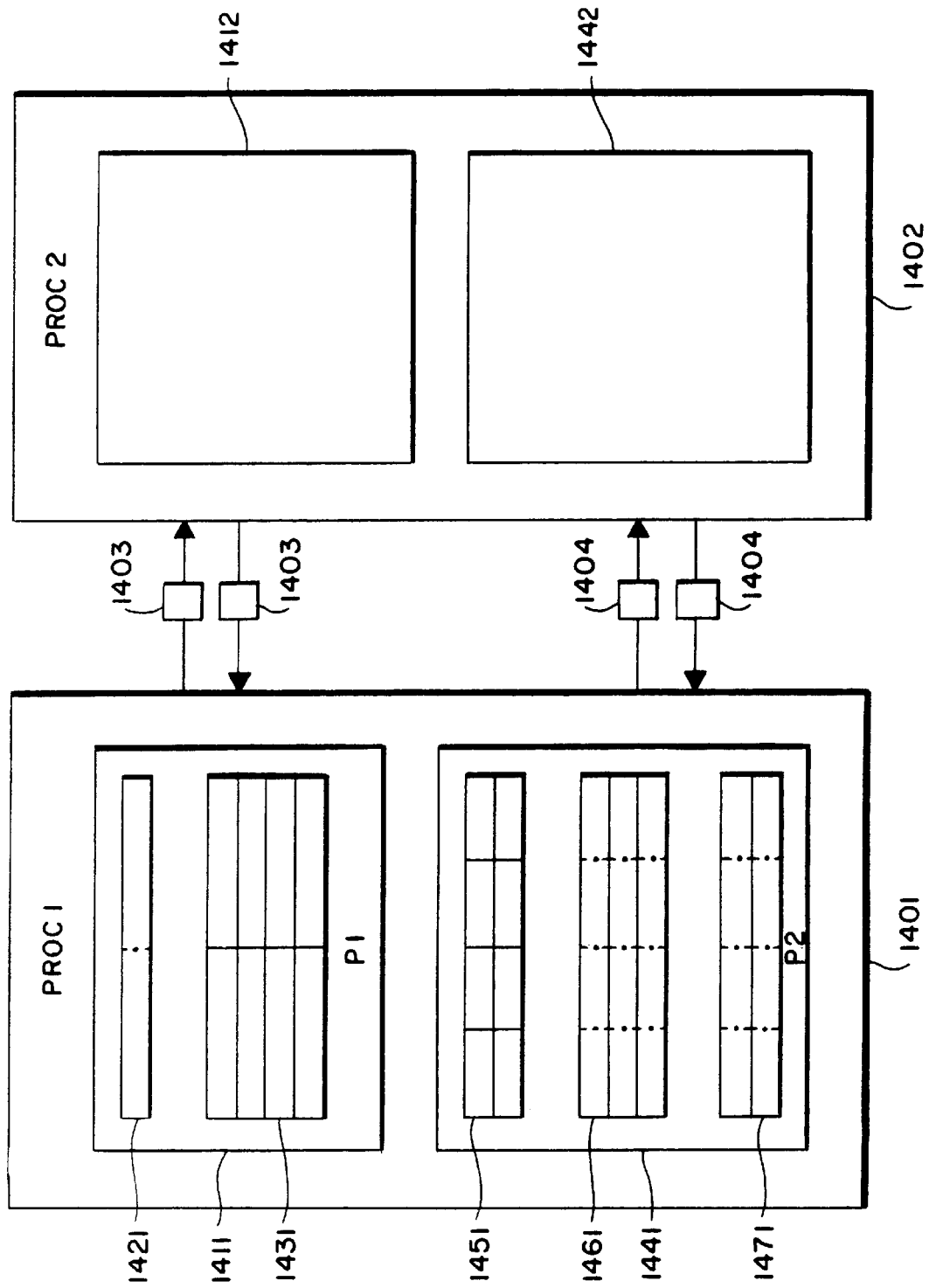
FIG. 14 is a block diagram of data structures having variable granularities.

FIG. 14 shows data structures having variable granularities. Memories 1401 are associated with a first processor (PROC1), and memories 1402 are associated with a second processor (PROC2).

Within memories 1401 of the first processor, a first program (P1) 1411 has allocated data structures to have lines of 64 bytes, and a second program (P2) 1441 has allocated data structures to have lines of 32 bytes.

The first program 1411 includes data structures 1421 and 1431. Data structures 1421 includes 1 block of 128 bytes, e.g., two lines per block. Data structures 1431 has 8 blocks of 64 bytes, e.g., one line per block.

The second program includes data structures 1451, 1461, and 1471. Data structures 1451 include eight blocks of 32 bytes (one line) each. Data structures 1461 includes three blocks of 128 bytes (four lines) each. Data structures 1471 includes one block of 256 bytes, e.g., eight lines.

The memories 1402 of the second processor include comparable programs 1412 and 1442 and their data structures. As described above, the processors communicate data in block sized units of transfer. For example, the first programs 1411 and 1412 transfer data using blocks 1403, and the second programs 1441 and 1442 transfer blocks 1404. As an advantage, the blocks 1403 and 1404 can have different sizes, e.g., variable granularities, and different line sizes, e.g., 32 and 64 bytes.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

Claimed are:

1. In a computer system including a plurality of symmetric multi-processors, each symmetric multi-processor including a plurality of processors, a memory having addresses, and an input/output interface connected to each other by a bus, the input/output interfaces connecting the symmetric multi-processors to each other by a network, a software implemented method for sharing access to data stored in the memories of the symmetric multi-processors, comprising the steps of:

designating a set of the addresses of the memories as virtual shared addresses to store shared data;

allocating a portion of the virtual shared addresses to store a shared data structure as one or more blocks accessible by programs executing in any of the processors, the size of a particular allocated block to vary with the size of the shared data structure, each block including an integer number of lines, each line including a predetermined number of bytes of shared data;

maintaining a shared state table including a plurality of shared state entries, there being one shared table entry for each line of the one or more blocks, each shared state entry to indicate a possible state of the line, the possible states being invalid, shared, exclusive, and pending; and maintaining a private state table for each processor of the plurality of symmetric multi-processors, each private state table having a plurality of private state entries, the private state table entries of a particular private state table to indicate a possible state of a particular line accessed by the associated particular processor:

storing directory information of a particular block of the shared data structure in the memory of a home processor, the directory information including the size of the particular block;

instrumenting the programs with instructions which access the shared data to check whether the data are available; and in response to receiving an access request from a requesting one of the processors to access the shared data, sending a particular block including the particular line and the size of the particular block to the requesting processor via the network to enable the processors to exchange shared data structures stored in variable sized blocks via the network.

2. The method of claim 1 further comprising:

storing the directory information in a directory maintained by the home processor, the directory including an entry for each line of the one or more blocks of the shared data structure, each entry including the size the particular block including the line.

3. The method of claim 2 further comprising:

maintaining, in the entry for each line of the particular block, an identity of a controlling one of the processors, the controlling processor last having an exclusive copy of the particular block including the particular line.

4. The method of claim 3 further comprising:

maintaining, in the entry, a bit vector, the bit vector including one bit for each processor, each bit to indicate whether a corresponding processor has a shared copy of the particular block.

5. The method of claim 1 further comprising:

dynamically changing the size of the one or more blocks allocated for the shared data structure while the programs are executing.

6. The method of claim 1 further comprising:

locking the shared state table before modifying one of the shared table entries.

7. The method of claim 6 further comprising:

setting the state of each line of the one or more blocks to invalid before dynamically changing the size of the one or more blocks.

8. The method of claim 7 further comprising:

modifying one of the private state tables only by the processor associated with the private state table.

9. The method of claim 8 further comprising:

selectively sending a message from a particular one of the processors of a particular symmetric multi-processor to other processors of the particular symmetric multi-processor when downgrading states in the private state table associated with the particular processor.

10. The method of claim 1 wherein the number of lines of the one or more blocks of a first shared data structure are different than the number of lines of the one or more blocks of a second data structure.

11. The method of claim 1 wherein the number of bytes in one of the lines of the first data structure in one program are different than the number of bytes in one of the lines of a second data structure in another program.

12. The method of claim 1, wherein the designating step includes a private data section used to store data structures for use by a single local processor.

13. The method of claim 1, wherein the designating step provides a state table which includes the shared state table and the private state table.

14. The method of claim 13, wherein the state table includes exclusion tables as a part thereof, the exclusion tables including a shared portion and a private portion.

15. A system comprising:

a network;

a plurality of symmetric multi-processors interconnected by the network, each symmetric multi-processor including a plurality of processors; and a memory having a layout of addresses for each symmetric multi-processor, each memory address having a designated set of virtual shared addresses to store shared data, a portion of the virtual shared addresses storing a shared data structure as one or more blocks accessible by programs executing in any of the processors, the size of a particular allocated block varying with a size of the shared data structure, each block including an integer number of lines, each line including a predetermined number of bytes of shared data;

wherein the layout includes:

i) a shared state table including a plurality of shared state entries, one shared entry for each line of the one or more entries, each shared entry indicating a possible state of the line, the possible states being invalid, shared, exclusive and pending;

ii) a private state table for each processor of the plurality of symmetric multi-processors, each private state table having a plurality of private state entries, the private state entries of a particular private state table indicating a possible state of a particular line accessed by the associated particular processor;

wherein the shared data is accessed to check whether the data are available and a particular block is sent to a requesting processor from one other processor via the network to exchange shared data structures stored in variable sized blocks.

16. The system of claim 15, wherein the private state table includes an exclusion table.

17. The system of claim 16, wherein the exclusion table includes a shared portion and a private portion.

18. The system of claim 15, wherein the shared state table is capable of being locked before one of the shared table entries is modified.

19. The system of claim 15, wherein the private state table of a particular processor is capable of modification only by that processor associated with the private state table.

20. The system of claim 15, wherein one of the processors is designated as a home processor for storing directory information of a particular block of the shared data structure in the memory, the directory information including the size of the block.

* * * * *